Aug. 6, 1929.  P. W. LEHMAN  1,723,562
MANUFACTURE OF PNEUMATIC TIRE CASINGS
Filed Dec. 9, 1926   2 Sheets-Sheet 1
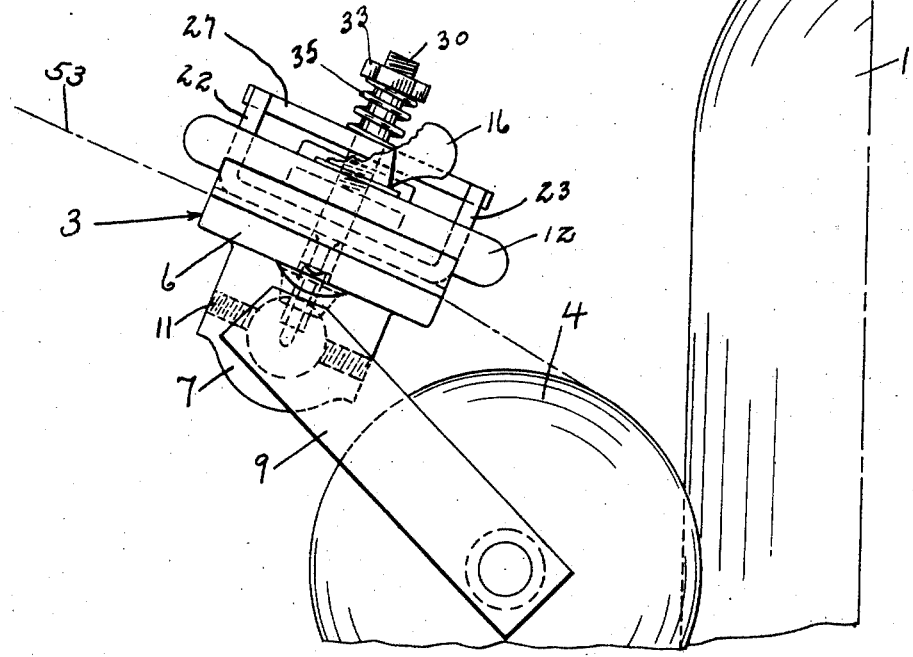
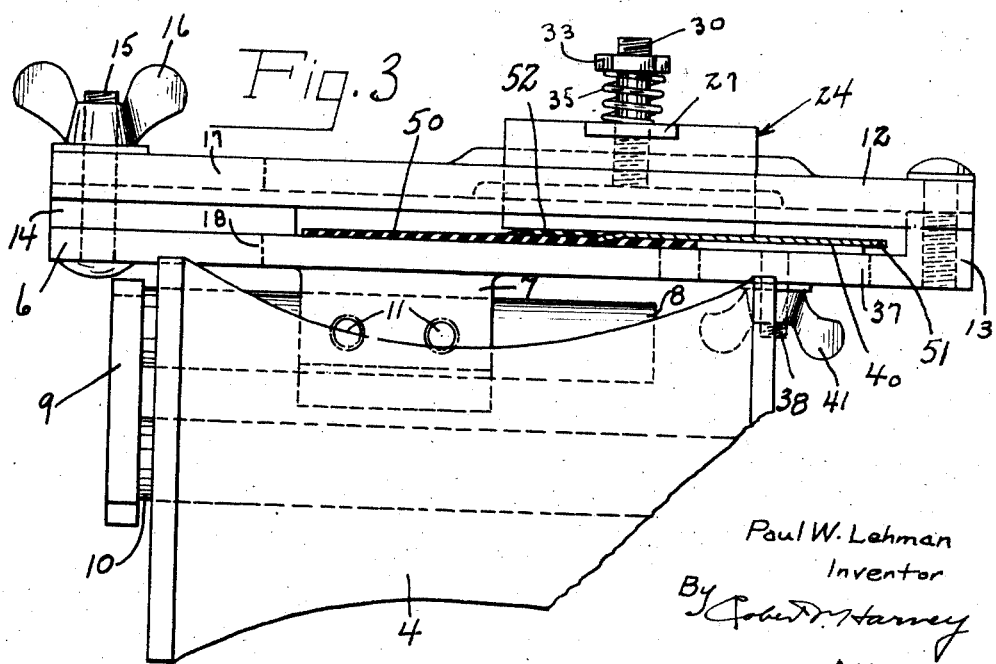
Paul W. Lehman
Inventor
By Robert N. Harvey
Attorney

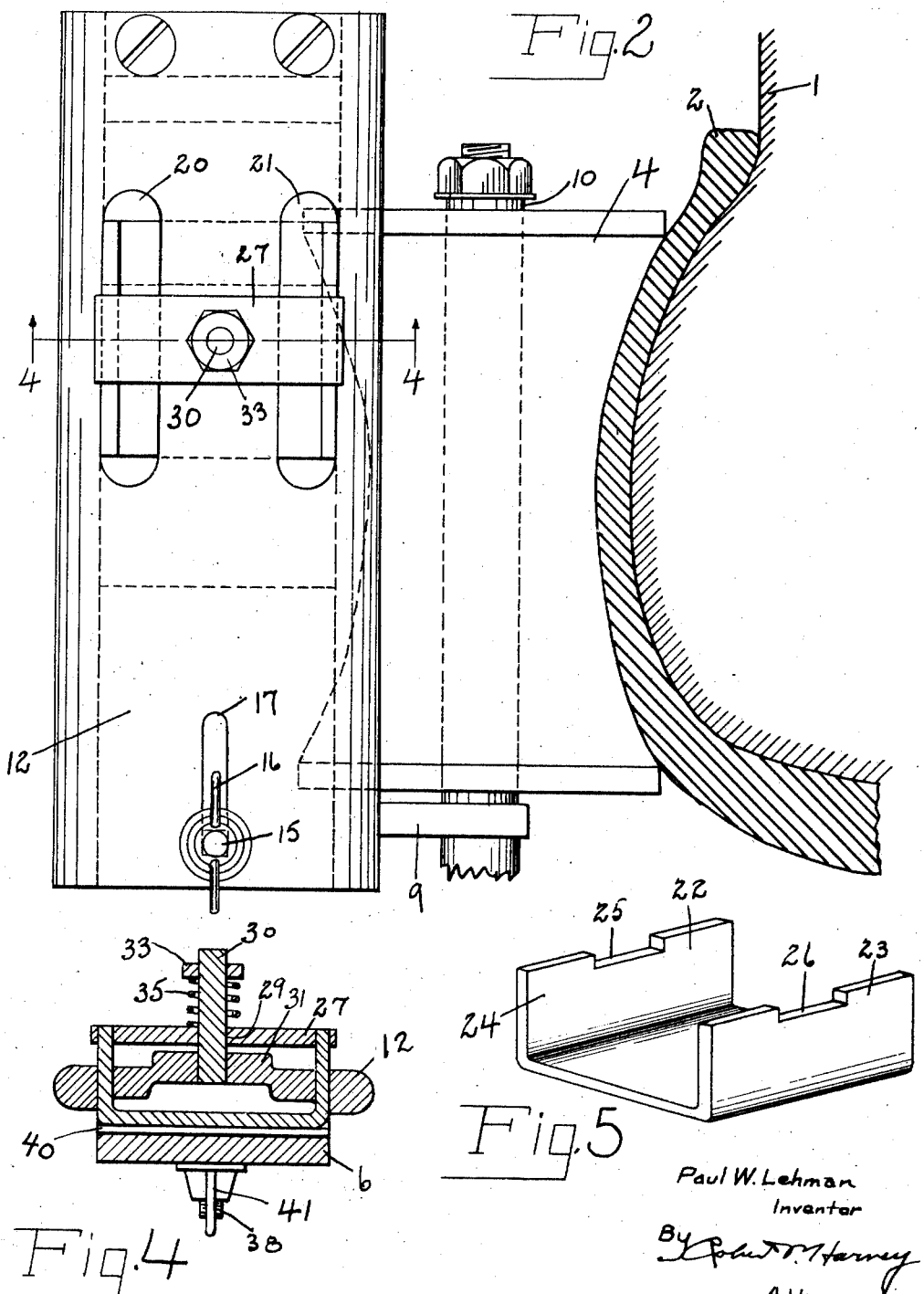

Patented Aug. 6, 1929.

1,723,562

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

MANUFACTURE OF PNEUMATIC-TIRE CASINGS.

Application filed December 9, 1926. Serial No. 153,606.

My invention relates to the manufacture of pneumatic tire casings and more particularly to a device for applying the so-called sidewall and chafing strips as a unit to the tire carcass while the latter is supported upon the building core. It is among the objects of my invention to provide a device for this purpose, which will accurately guide the unit strip into position on the casing and apply a uniform tension to the strip in such manner that the proper amount of sidewall rubber and chafing strip will be placed on the casing. A further object is to provide a device such that the unit sidewall and chafing strip may be applied to each side of the casing simultaneously. Other and further objects will be apparent from the following specification and claims.

In the accompanying drawings which illustrate one embodiment of my invention,

Figure 1 is an end view of the device shown in operative relation with the core, Figure 2 is plan view of the mechanism shown in Figure 1 the building core and casing being shown in cross-section.

Figure 3 is a front side view of the device showing the combination sidewall and chafing strip in section and in operative position with respect to the guiding and tensioning members, Figure 4 is a section substantially on line 4—4 of Figure 2 and Figure 5 is a detailed perspective view of the tension applying shoe.

Referring to the drawings 1 designates the building core of a tire building machine and 2 diagrammatically indicates the tire carcass to which the sidewall and chafing strip is to be applied. The applying device of my invention comprises a guiding and tensioning member, generally indicated at 3, and an applying roll 4. Member 3 and roll 4 are secured together as later described and are adapted to be brought into operative relation with the core 1 and carcass 2 as shown in Figures 1 and 2. Member 3 and roll 4 may be supported in any suitable manner to be moved to and from operative position and since supporting means will vary with the type of building machine used, and in itself forms no part of my invention, it is omitted for the sake of clearness. A suitable type of support is shown in the co-pending application of George F. Wikle, Serial Number 700,395, filed March 19, 1924, Patent No. 1,667,135, April 24, 1928.

The member 3 comprises upper and lower plates designated 12 and 6 respectively and spaced from each other by a lug 13 formed at one end of plate 6 and a guide plate 14 adapted to be held in adjusted position by means of bolt 15 provided with a wing nut 16 and sliding in slots 17 and 18 formed respectively in plates 12 and 6. The under side of plate 6 is provided with a boss 7 adapted to receive a stub shaft 8 secured to an arm 9 secured in turn to shaft 10 of applying roll 4. Plate 6 is held in adjusted position on shaft 8 by means of set screws 11. Plate 12 is provided adjacent one end with longitudinal slots 20 and 21 adapted to receive the upstanding sides 22 and 23 of a U shaped tension applying shoe 24. Sides 22 and 23 are provided respectively with rectangular notches 25 and 26 adapted to receive a cross-plate 27 apertured at 29 for the passage of a stem 30 secured in an arched portion 31 of plate 12 intermediate slots 20 and 21. Stem 30 is threaded at its upper end to receive a nut 33 between which and plate 27 is positioned a compression spring 35. As will be evident spring 35 tends to force shoe 24 downwardly against the bottom plate 6 and the pressure of shoe 24 may be adjusted by means of nut 33. Plate 6 is provided adjacent lug 13 with a longitudinal slot 37 adapted to receive the stem 38 of guide plate 40, stem 38 being provided with a wing nut 41 to hold plate 40 in adjusted position with respect to plate 6. While the unit sidewall and chafing strip varies in different types of tire construction it usually includes a strip of sidewall rubber 50 and a chafing strip 51 overlapping one edge of the sidewall rubber, it being also customary to apply a strip of gum 52 over the edge of the chafing strip 40 where it overlaps the sidewall rubber. When a sidewall and chafing strip of this type is used its position, with respect to the elements of my device, is shown in Figure 3 where the guide plate 40 is shown engaging the edge of the rubber strip 50 and underlying the chafing strip 51. Shoe 24 is so positioned as to act upon the overlapping portion of the sidewall rubber and chafing strip and to apply tension centrally to the strip as a whole. This application of tension to the central portion of the unit strip while the edges remain relatively free of tension is an essential element of my invention.

It will be understood that with a type of sidewall presenting a smooth under surface plate 40 will be omitted and guide 14 relied upon to position the strip. In operation, with the device in the position shown in Figures 1 and 2, the unit sidewall, fed from suitable reels or other source of supply, is passed through the device as shown in Figure 3 and over applying roll 4 as indicated by broken line 53 in Figure 1. As will be obvious from Figure 2 the unit sidewall strip as it is applied to the tire must be transversely curved to correspond to the curvature of the tire carcass. The application of tension to the central portion only of the strip assists the smooth application of both sidewall rubber and chafing strip. Since the degree of tension imparted to the strip as it is applied to the core determines the amount of strip applied, the application of such pressure to the center of the strip (which when the strip is in position on the tire casing corresponds to the mean circumference of the strip) functions to assure the application of the amount of sidewall rubber and chafing strip that is most desirable. It is further evident that my device is substantially automatic in character the operator merely engaging the advance end of the strip between roll 4 and the carcass on the core, setting the core in rotation and then severing the strip when the starting point is reached. My device thus makes it possible to apply the unit sidewall to both sides of the casing simultaneously.

Having described one embodiment of my invention I claim:

1. A device of the character described comprising a roll adapted to apply a unit sidewall strip to a tire carcass supported upon a rotatable building core, means associated with the roll for guiding the strip thereto, and means positioned to apply a predetermined tension to the central portion only of the strip as it is applied to the carcass.

2. A device of the character described comprising a roll adapted to apply a unit sidewall strip to a tire carcass supported upon a rotatable building core, an adjustable guide member associated with the roll to guide the strip thereto and means forming part of said member adapted to apply a predetermined tension to the central portion only of the strip as it is applied to the carcass.

3. A device of the character described comprising a roll adapted to be positioned to apply a unit sidewall strip to a tire carcass supported upon a rotatable building core, an adjustable guide member associated with the roll to guide the strip thereto, said guide member comprising upper and lower plates between which the strip passes and a spring pressed shoe, carried by the upper plate, adapted to apply a predetermined tension to the central portion only of the strip as the latter is applied to the carcass.

4. A device of the character described comprising a roll adapted to be positioned to apply a unit sidewall strip to a tire carcass supported upon a rotatable building core, an adjustable guide member associated with the roll to guide the strip thereto, said guide member comprising upper and lower plates between which the strip passes, an adjustable guide plate positioned between said upper and lower plates and adapted to engage an outer edge of the strip and a spring pressed shoe, carried by the upper plate, adapted to apply a predetermined tension of the central portion only of the strip as the latter is applied to the carcass.

5. A device of the character described comprising a roll adapted to be positioned to apply a unit sidewall, formed of overlapping rubber and fabric strips, to a tire carcass supported upon a rotatable building core, an adjustable guide member associated with said roll to guide the unit sidewall strip thereto, said guide member comprising upper and lower plates between which the sidewall passes, a guide plate adjustably carried by said lower plate adapted to engage the inner edge of the rubber strip and to underlie the fabric strip and a spring pressed shoe, carried by said upper plate, adapted to apply a predetermined tension to the central portion only of the unit sidewall as the latter is applied to the carcass.

6. A device of the character described comprising a roll adapted to be positioned to apply a unit sidewall, formed of overlapping rubber and fabric strips, to a tire carcass supported upon a rotatable building core, an adjustable guide member associated with said roll to guide the unit sidewall strip thereto, said guide member comprising upper and lower plates between which the sidewall passes, an adjustable guide plate positioned between said upper and lower plates and adapted to guide the outer edge of the rubber strip, a second guide plate adjustably carried by said lower plate and adapted to engage the inner edge of the rubber strip and to underlie the fabric strip, and a spring pressed shoe, carried by said upper plate, adapted to apply a predetermined tension to the central portion only of the unit sidewall as the latter is applied to the carcass.

In testimony whereof I have signed my name to the above specification.

PAUL W. LEHMAN.